UNITED STATES PATENT OFFICE.

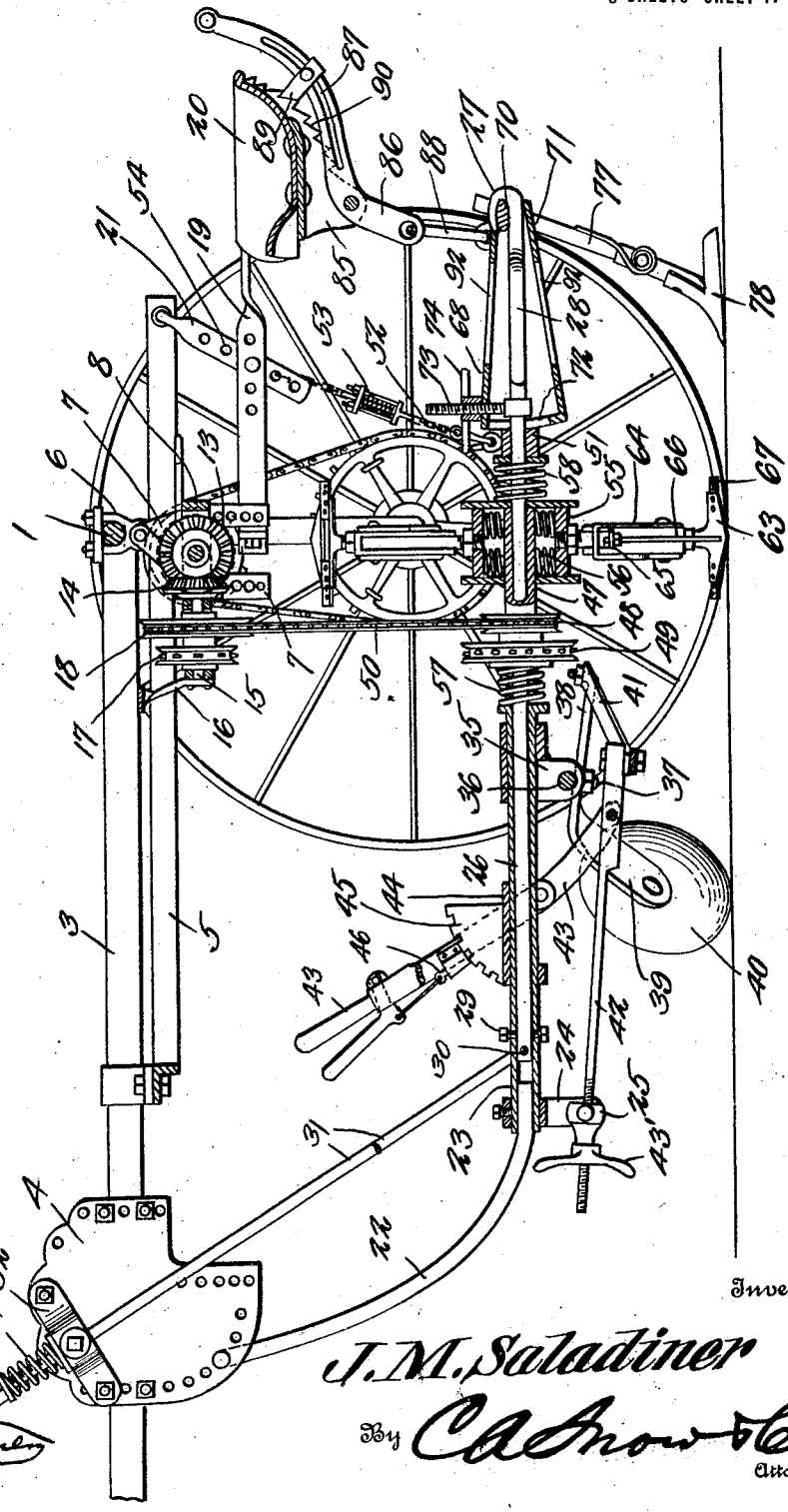

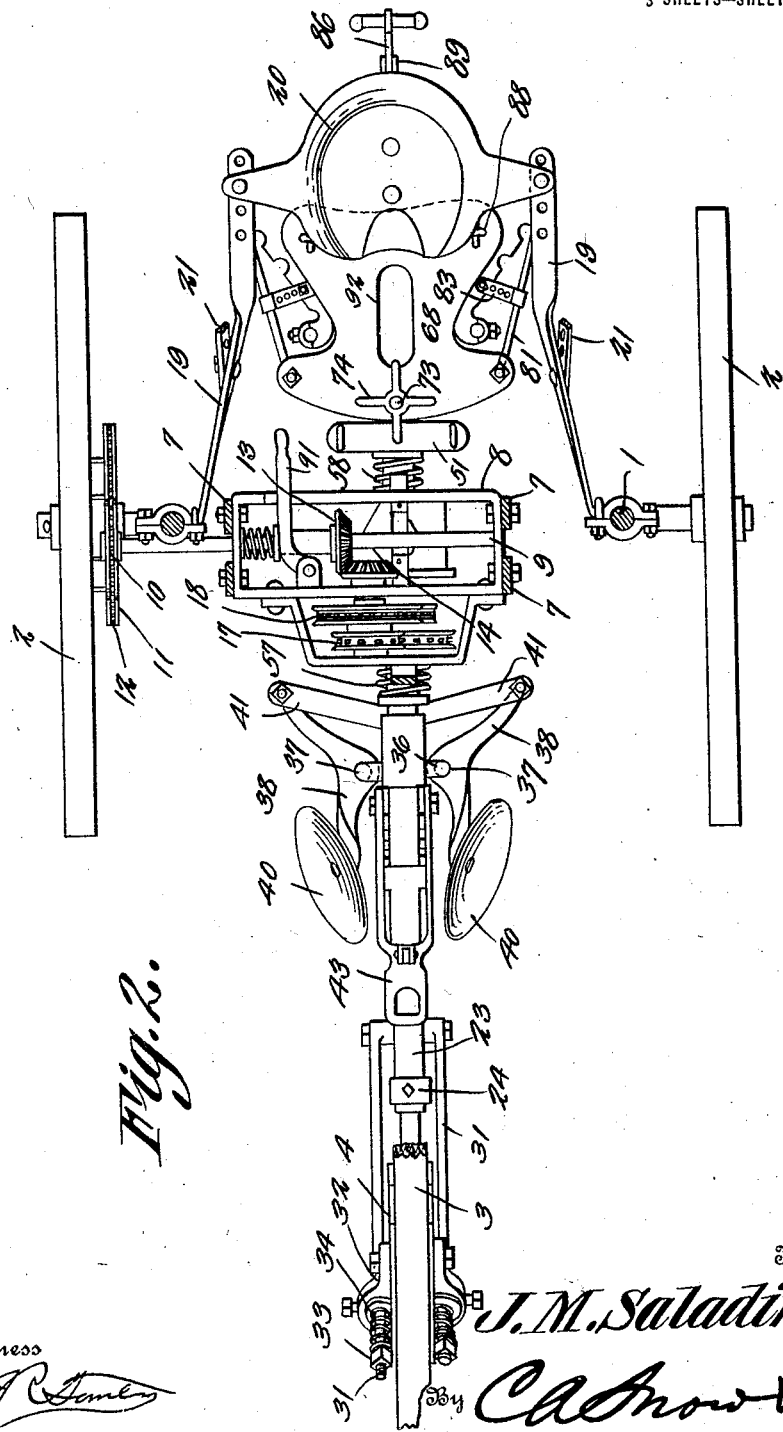

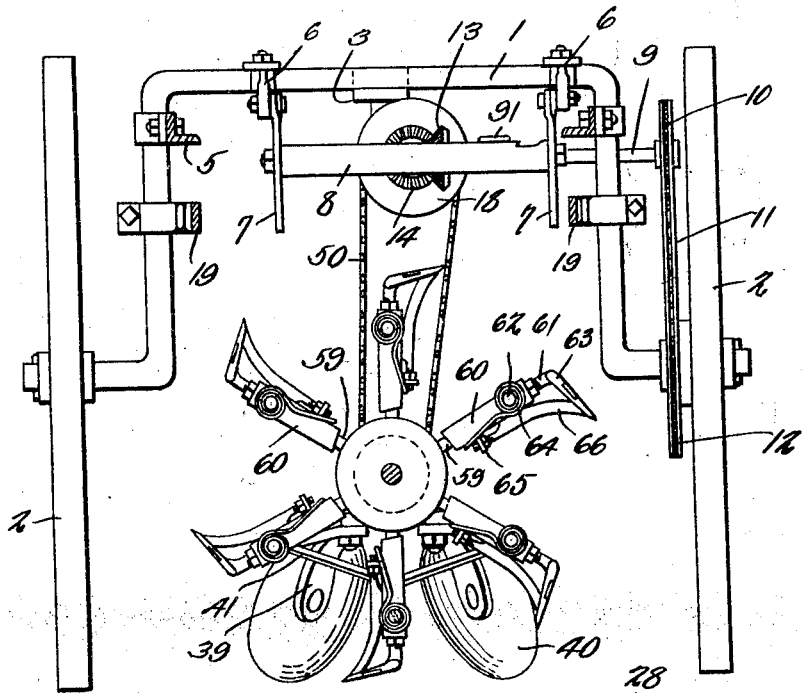

JOSEPH M. SALADINER, OF BRYAN, TEXAS.

COTTON CHOPPER.

1,411,383.    Specification of Letters Patent.    Patented Apr. 4, 1922.

Application filed April 20, 1920. Serial No. 375,316.

*To all whom it may concern:*

Be it known that I, JOSEPH M. SALADINER, a citizen of the United States, residing at Bryan, in the county of Brazos and State of Texas, have invented a new and useful Cotton Chopper, of which the following is a specification.

This invention relates to machines for chopping cotton plants, one of its objects being to provide, in a single machine, a means for barring off the rows, chopping transversely through the row for cutting out the plants at regular intervals, and for cultivating between the rows, all of the operations taking place simultaneously.

A further object is to provide barring off disks which can be easily adjusted toward or from each other so as to regulate the cut produced thereby.

A still further object is to provide a chopping element capable of yielding bodily in the direction of the length of the machine, so that should one of the chopping hoes come into contact with a stump or other unyielding object in the path thereof, there would be no danger of breaking the part.

A further object is to provide a chopping element the hoes of which are mounted to yield radially relative to the shaft on which they are mounted.

A further object is to provide cultivating elements which are adjustable angularly relative to the longitudinal axis of the machine and which are also capable of up and down adjustment.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a vertical longitudinal section through the machine.

Figure 2 is a plan view the upper portion of the structure being removed.

Figure 3 is a vertical transverse section showing the chopping element in elevation.

Figure 4 is a bottom plan view of a portion of the machine and showing one of the adjustable connections for the sweep or cultivating element.

Referring to the figures by characters of reference 1 designates an arched axle supported by wheels 2 and having a forwardly extending tongue 3 to the front end of which is attached a clevis 4.

Secured to the tongue 3 is the intermediate portion of an elongated U-shaped frame 5 the sides of which are attached to the arched axle 1. Clips 6 are attached to the axle and depending from each of these clips is a pair of hangers 7. These hangers 7 are secured to the ends of a frame 8 supported under the intermediate portion of the axle 1 and in which frame is journaled a transverse shaft 9 having a socket 10 adapted to receive motion through a chain 11 from another socket 12 secured to one of the wheels 2. A gear 13 is secured to this shaft 9 and meshes with another gear 14 secured to a longitudinal shaft 15 which is journaled in the front portion of the frame 8 and also in a bracket 16 extending downwardly from the tongue 3. To the shaft 15 are secured sprockets 17 and 18 of different sizes.

Extending rearwardly from the hangers 7 are supporting strips 19 the rear ends of which are connected to a seat 20, these strips 19 being connected to the rear portions of the frame 5 by hangers 21, as shown.

Adjustably connected to and extending downwardly and rearwardly from the clevis 4 is a rod 22 the lower end of which projects into the front end of a tubular member 23. Extending downwardly from the front end of the tube 23 is a bracket 24 having a sleeve 25 swiveled therein. A rod 26 is seated in the tube 23 and extends rearwardly therefrom, the rear portion of this rod forming a hook 27 and there being an elongated loop or eye 28 formed by the rod adjacent the rear end thereof. Set screws 29 serve to secure the rod in the tube 23 and an additional securing means is provided in the form of a transverse pin 30 the ends of which are secured within the lower ends of brace rods 31 which extend to opposite sides of the clevis 4 and are slidable within brackets 32 secured to the sides of the clevis. The upper ends of these brace rods have nuts 33 adjustable thereon and cushioning springs 34 are mounted between these rods and the brackets 32. Thus the rods are free to have a slight longitudinal movement relative to the clevis 4, thereby allowing the rod 31 to swing about its connection with the clevis.

A bracket 35 is extended downwardly from the rear portion of the tube 23 and is engaged by a transverse rod 36 having downwardly extending terminals 37 on which are pivotally mounted bell crank levers 38 the forward ends of which are downturned, as at 39 and constitute standards on which are journaled barring off disks 40. Toggle links 41 are attached to the rear ends of the bell crank levers 38 and to the rear end of a rod 42 which is slidably mounted in the sleeve 25 and is engaged by a nut 43'. Thus it will be seen that by rotating this nut 43' the rod 42 can be adjusted longitudinally so as to pull through the toggle links 41 upon the bell crank levers 38 so as to shift the disks 40 relative to each other. A lever 43 is pivotally connected to the rod 42 and is also pivotally connected between its ends to a sleeve 44 which is slidable on the tube 23 and carries a toothed segment 45. Lever 43 has a dog 46 thereon adapted to engage the toothed segment 45 so as to lock the disks 40 against movement. By means of this lever 43 the rod 42 and links 41 can be swung downwardly so as to rotate the rod 36 and lift the disks 40 out of contact with the ground or said disks can be moved downwardly so as to press firmly against the soil. During this movement of the lever 43 the sleeve 44 will slide along the tube 23 as will be obvious.

Mounted for rotation on the rod 26 back of the tube 23 is a sleeve 47 having sprockets 48 and 49 thereon of different sizes either one of which is adapted to receive motion through a chain 50 from the sprockets 17 and 18 respectively. A cross-head 51 is mounted on the rod 26 beyond the rear end of the sleeve 47 and is adapted to be supported by chains 52 connected to the hangers 21, these chains preferably including resilient couplings 53 so as to provide yielding supports. A series of openings 54 is provided in each of the hangers 21 and the chains can be placed in engagement with the wall of any one of these openings thus to support the cross-head 51 at any height desired.

A drum 55 is extended around the sleeve 47 and is connected thereto by annular series of radial springs 56 whereby the drum is caused to rotate with the sleeve 47 but is at the same time free to move radially or in any other direction relative to the sleeve. A spring is mounted on the rod 26 between the sleeve 47 and the tube 23, this spring being indicated at 57 and another spring 58 is mounted on the rod 26 between the sleeve 47 and the cross-head 51. By providing these springs the sleeve 47 is free to shift longitudinally along the rod, carrying the drum 55 therewith, when the forward movement of the drum with the rod is resisted by any object as will be hereinafter explained.

Secured to the drum and extending radially therefrom are stems 59 each of which has a channeled extension 60 in which is pivotally mounted a stem 61, the pivot of each of these stems being indicated at 62. Each of the stems 61 has a cutting blade 63 extending at an angle therefrom and in the direction of rotation of the chopping element and a spring 64, which is coiled about the pivot of each of the stems 61, serves to hold said stems normally in alignment with the stems 59. The channeled member 60 has a bracket 65 to which is secured a cutting blade 66 extending downwardly to the center of the blade 63 and which blade 66 is adapted to cut through vines, weeds, etc., in the path thereof. Each of the blades 63 may be provided with a laterally extending wing 67 at each side thereof whereby the width of the cut made by the blade 63 can be varied at will.

It will be obvious that, during the rotation of the chopping element transversely through the row of plants, any one of the blades 63 will yield rearwardly against the tension of the spring 64 thereof should said blade come against an unyielding obstruction. Consequently injury to the blade is often prevented. Furthermore if, during the advancement of the machine, the side of one of the blades should come against an unyielding obstruction, the sleeve 47 would be free to slide rearwardly against the spring 58 until the blade has passed the obstruction whereupon the spring would return the drum 55 and its parts to normal position.

Extending over the rear portion of the rod 26 is a frog 68 the rear corner portions of which are connected, by bolts 69, to a cross strip 70 engaged by the hooked end 27 of the rod 26. Another frog 71 is extended under the rear portion of the rod 26 and is fastened in place by the bolts 69, the front portion of this plate 71 being extended upwardly to the plate 68 and provided with a slot 72 through which the rod 26 extends. A threaded stem 73 projects upwardly from the rod 26 and through the plate 68 and is engaged by a nut 74 so that, by rotating this nut, the plate 68 can be tilted relative to the rod 26.

Pivotally mounted on the bolts 69 are holding plates 75 each of which has recesses 76 along the outer edge thereof for receiving the shank or standard 77 of a sweep or cultivator blade 78, the said standard being held securely in place by means of clips 79 or the like. An eye 80 extends upwardly from the rear portion of each plate 75 and is adjustably engaged by a rod 81 the forward end of which is attached to the plates 68 and 71. Nuts 82 engage the rod 81 at opposite sides of the eye 80 for the purpose of holding the parts against relative movement after adjustment. A strip 83 having a longitudinal series of apertures 84 is mounted on the rod 81 and is adjustably connected to the forward portion of the plate 68. It will be obvious that by means of this arrangement the plate 68 can be adjusted laterally about its pivot bolt 69 and can then be secured by means of the nuts 82 on the rod 81. Thus the cultivator blades or sweeps connected to the plate 68 can be brought to any desired position relative to the row of plants being operated on.

The seat 20 occupied by the driver has a bracket 85 extending downwardly therefrom and to this bracket is connected a lever 86 having a longitudinal slot 87. The lower end of the lever is connected by links 88 or the like to the plate 68 and it will be obvious that by swinging the lever 86 the plate 68 can be raised or lowered thus to shift the cultivating blades or sweeps relative to the surface of the ground. For the purpose of holding the lever 86 in any position to which it may be adjusted, a dog 89 is adjustable longitudinally along the slot 87 and is adapted to engage any one of a series of ratchet teeth 90 which are secured to the bracket 85.

It will be understood that when the machine is drawn along a row of plants the disks 40 can be adjusted as hereinbefore pointed out so as to bar off the row after which the chopping element, which is rotated continuously by means of the mechanism described, will cut transversely through the row, removing plants at regular intervals. The cultivating sweeps or blades 78 will cultivate between the rows.

The gear 13 can be shifted by a lever 91 so as to uncouple the chopping mechanism from the wheels.

By providing the loop 28 the driver can see through openings 92 in the plates 68 and 71, and watch the action of the chopping blades.

What is claimed is:

1. In a cotton chopper the combination with a wheel supported structure, and a chopping element carried thereby, of barring off elements supported in front of the chopping element, means for adjusting the barring off elements angularly relative to each other, and means for simultaneously raising or lowering the barring off elements relative to the ground.

2. In a cotton chopper the combination with a wheel supported structure and a chopping element carried thereby, of barring off disks in advance of the chopping element, means for swinging said disks toward and from each other, means for holding the disks in adjusted position and means for raising and lowering the disks relative to the chopping elements and for holding said disks in any positon to which they may be shifted.

3. In a cotton chopper the combination with a wheel supported structure and a chopping element carried thereby, of barring off disks in advance of the chopping element, means for swinging said disks toward and from each other, and means for holding the disks in adjusted position, and means for raising and lowering the disks relative to the chopping element.

4. In a cotton chopper the combination with a wheel supported structure, of a rod extending continuously within said structure, means for supporting the respective ends of the rod, barring off means adjustably mounted upon one portion of the rod, a chopping element movably supported by an intermediate portion of the rod, and cultivating means carried by the rear portion of the rod.

5. In a cotton chopper the combination with a wheel supported structure, of a rod, means for supporting the rod in said structure, a drum mounted for rotation relative to the rod, yielding means for holding the drum normally concentric with its axis of rotation, said drum being shiftable radially relative to its axis of rotation against the action of said holding means, yielding means for holding the drum against longitudinal movement, chopping elements carried by and movable with the drum, and means for transmitting motion to the drum from one of the supporting wheels.

6. In a cotton chopper the combination with a wheel supported structure, a rod supported therein, and means connected to the ends of the rod for holding the same, of a sleeve mounted for rotation on the rod, a drum extending around the sleeve, springs connecting the drum to the sleeve, said drum being yieldable radially in any direction relative to the sleeve but being revoluble with said sleeve, chopping elements carried by the drum, and means for transmitting motion to the sleeve and drum from the supporting wheels.

7. In a cotton chopper the combination with a wheel supported structure, a rod supported therein, and means connected to the ends of the rod for holding the same, of a sleeve mounted for rotation on the rod, a drum extending around the sleeve, springs connecting the drum to the sleeve, said drum being yieldable radially in any direction relative to the sleeve but being revoluble with said sleeve, chopping elements carried by the drum, means for transmitting motion to the sleeve and drum from the supporting wheels, and yielding means upon the rod for holding the drum against movement longitudinally of the rod.

In testimony that I claim the foregoing as my own, I have hereto affixed my signature in the presence of two witnesses.

JOSEPH M. SALADINER.

Witnesses:
 F. L. WEBB,
 J. H. RANSON.